US009672438B2

(12) United States Patent
Maltun et al.

(10) Patent No.: US 9,672,438 B2
(45) Date of Patent: *Jun. 6, 2017

(54) TEXT PARSING IN COMPLEX GRAPHICAL IMAGES

(71) Applicant: Procore Technologies, Inc., Carpinteria, CA (US)

(72) Inventors: Andrew Lee Maltun, Santa Barbara, CA (US); Michael Anthony Stock, II, Santa Barbara, CA (US); Jake Sanders, Santa Barbara, CA (US)

(73) Assignee: Procore Technologies, Inc., Carpinteria, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/347,433

(22) Filed: Nov. 9, 2016

(65) Prior Publication Data

US 2017/0061228 A1 Mar. 2, 2017

Related U.S. Application Data

(63) Continuation of application No. 14/699,989, filed on Apr. 29, 2015, now Pat. No. 9,530,070.

(51) Int. Cl.
| G06K 9/34 | (2006.01) |
| G06F 17/27 | (2006.01) |
| G06K 9/00 | (2006.01) |
| G06T 7/00 | (2017.01) |

(52) U.S. Cl.
CPC ......... *G06K 9/348* (2013.01); *G06F 17/2705* (2013.01); *G06K 9/00476* (2013.01); *G06T 7/0081* (2013.01); *G06T 2207/20104* (2013.01); *G06T 2207/30176* (2013.01)

(58) Field of Classification Search
USPC ............... 382/176, 170, 321, 228, 277; 1/1; 370/401; 704/2, 3, 8; 709/220, 230
See application file for complete search history.

(56) References Cited

U.S. PATENT DOCUMENTS

| 5,434,962 A | 7/1995 | Kyojima et al. |
| 6,298,357 B1 | 10/2001 | Wexler et al. |
| 7,165,216 B2 | 1/2007 | Chidlovskii et al. |
| 7,797,622 B2 | 9/2010 | Dejean et al. |
| 7,937,653 B2 | 5/2011 | Dejean et al. |
| 8,009,921 B2 | 8/2011 | Csurka |
| 8,438,004 B2 | 5/2013 | Carter |
| 9,530,070 B2 * | 12/2016 | Maltun ................. G06K 9/348 |
| 2003/0208502 A1 | 11/2003 | Lin |
| 2006/0155703 A1 | 7/2006 | Dejean et al. |
| 2012/0075648 A1 | 3/2012 | Keys et al. |
| 2012/0323919 A1 | 12/2012 | Alba et al. |
| 2012/0324341 A1 | 12/2012 | Dejean |

(Continued)

FOREIGN PATENT DOCUMENTS

JP 2008-166958 7/2008

*Primary Examiner* — Anh Do
(74) *Attorney, Agent, or Firm* — SoCal IP Law Group LLP; Jonanthan Pearce; Steven C. Sereboff

(57) ABSTRACT

A method for parsing the text of a complex graphical image comprises obtaining a series of blocks of text from a complex graphical image. Those blocks of text are used to generate location scores, size scores and length scores. Each of the scores is weighted and linearly summed. The highest resulting sum is identified as the most likely to be a desired text block.

20 Claims, 11 Drawing Sheets

(56) References Cited

U.S. PATENT DOCUMENTS

2013/0024475 A1  1/2013 Sappey et al.
2014/0212038 A1  7/2014 Dejean et al.
2014/0229426 A1  8/2014 Gootee, III et al.

* cited by examiner

|  | Text Block 1 701 | | | Text Block 2 711 | | |
|---|---|---|---|---|---|---|
|  | Value | Score | Weight | Value | Score | Weight |
| Content | "SL-600" | N/A | N/A | "9/18" | N/A | N/A |
| English Words? | No | N/A | N/A | No | N/A | N/A |
| Font Height | 41 px | 0.35 | 0.52 | 12 px | 0.12 | 0.52 |
| Distance from Bottom Right | 227 px | 0.84 | 0.31 | 53 px | 0.97 | 0.31 |
| Length | 6 | 0.79 | 0.17 | 6 | 0.79 | 0.17 |
| Cumulative Score | 0.35*0.52+0.84*0.31+0.79*0.17 = 0.577 | | | 0.12*0.52+0.97*0.31+0.79*0.17 = 0.497 | | |

FIG. 7

| CURRENT DRAWINGS | | | | | Subscribe |
| --- | --- | --- | --- | --- | --- |
| | | | | | View As: List \| Thumbnail |
| | | | | | Select All |
| | Drawing # | Drawing Title | Rev. # | Date | Set | Download | Select |
| ADA | HC1 | Accessible Parking | 0 | 01/12/2015 | First Submittal Set | | |
| Architectural | | | | | | | |
| | A1 | Parking Plan – First Floor | 0 | 01/12/2015 | First Submittal Set | | |
| | A2 | Demo Plan – Second Floor | 0 | 01/12/2015 | First Submittal Set | | |
| 1010 | 16 | Floor Plan – Second Floor | 1 | 01/22/2015 | Client Revisions | | |
| 1020 | 24 | Reflected Ceiling – Second Floor | 1 | 01/22/2015 | Client Revisions | | |
| | A5 | Demo Plan – Third Floor | 0 | 01/12/2015 | First Submittal Set | | |
| 1030 | 34 | Floor Plan – Third Floor | 1 | 01/22/2015 | Client Revisions | | |
| 1040 | 44 | Reflected Ceiling – Third Floor | 1 | 01/22/2015 | Client Revisions | | |
| | A8 | Schedules | 0 | 01/12/2015 | First Submittal Set | | |
| | A9 | Details | 0 | 01/12/2015 | First Submittal Set | | |
| | A10 | Wall Sections | 0 | 01/12/2015 | First Submittal Set | | |
| | A11 | Cloud Light Fixture Plans | 0 | 01/12/2015 | First Submittal Set | | |
| | A12 | Existing Path of Travel & Interior Elevations | 0 | 01/12/2015 | First Submittal Set | | |
| Electrical | | | | | | | |
| | E1 | Title Sheet, Symbols List, & Sheet Index | 1 | 02/20/2015 | Engineering Revisions | | |
| | E2 | Lighting Plan – Second Floor | 1 | 02/20/2015 | Engineering Revisions | | |
| | E3 | Lighting Plan, Low Voltage – Second Floor | 1 | 02/20/2015 | Engineering Revisions | | |
| | ... | ... | ... | ... | ... | | |

1000

© 2015 Procore Technologies, Inc.

FIG. 10

CURRENT DRAWINGS

View As: List | Thumbnail  
Subscribe  
Select All

| | Drawing # | Drawing Title | Rev. # | Date | Set | Download | Select |
|---|---|---|---|---|---|---|---|
| ADA | | | | | | | |
| | HC1 | Accessible Parking | 0 | 01/12/2015 | First Submittal Set | | |
| Architectural | | | | | | | |
| | A1 | Parking Plan – First Floor | 0 | 01/12/2015 | First Submittal Set | | |
| | A2 | Demo Plan – Second Floor | 0 | 01/12/2015 | First Submittal Set | | |
| 1110 | A3 | Floor Plan – Second Floor | 1 | 01/22/2015 | Client Revisions | | |
| 1120 | A4 | Reflected Ceiling – Second Floor | 1 | 01/22/2015 | Client Revisions | | |
| | A5 | Demo Plan – Third Floor | 0 | 01/12/2015 | First Submittal Set | | |
| 1130 | A6 | Floor Plan – Third Floor | 1 | 01/22/2015 | Client Revisions | | |
| 1140 | A7 | Reflected Ceiling – Third Floor | 1 | 01/22/2015 | Client Revisions | | |
| | A8 | Schedules | 0 | 01/12/2015 | First Submittal Set | | |
| | A9 | Details | 0 | 01/12/2015 | First Submittal Set | | |
| | A10 | Wall Sections | 0 | 01/12/2015 | First Submittal Set | | |
| | A11 | Cloud Light Fixture Plans | 0 | 01/12/2015 | First Submittal Set | | |
| | A12 | Existing Path of Travel & Interior Elevations | 0 | 01/12/2015 | First Submittal Set | | |
| Electrical | | | | | | | |
| | E1 | Title Sheet, Symbols List, & Sheet Index | 1 | 02/20/2015 | Engineering Revisions | | |
| | E2 | Lighting Plan – Second Floor | 1 | 02/20/2015 | Engineering Revisions | | |
| | E3 | Lighting Plan, Low Voltage – Second Floor | 1 | 02/20/2015 | Engineering Revisions | | |
| | ... | ... | ... | ... | ... | | |

1100

© 2015 Procore Technologies, Inc.

FIG. 11

TEXT PARSING IN COMPLEX GRAPHICAL IMAGES

RELATED APPLICATIONS

The present application is a continuation of U.S. patent application Ser. No. 14/699,989 filed Apr. 29, 2015 entitled "Text Parsing in Complex Graphical Images," now U.S. Pat. No. 9,530,070 issued on Dec. 27, 2016.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to text parsing of complex graphical images.

Description of the Related Art

Optical character recognition (OCR) is a concept that is used to derive text from non-text-based document formats. These types of formats include portable document format (PDF) documents or image document formats (such as JPG/JPEG, GIF, PNG, TIFF, and other similar formats). Text-based documents store text data as text, whereas these non-text-based formats may store a series of pixels, or arrangement of images that have no direct relationship to the text that those pixels or images represent. OCR can "look" at an image and derive the most likely words that are shown in a given image.

One particular context in which OCR has been little-used is in architectural or plan drawings for large-scale building projects. The drawings are much larger (in scale) than a typical 8.5"×11" document and text is arranged in atypical places, in various sizes, and often with limited information pertaining to its meaning. Only one skilled in viewing plan drawings or architectural drawings may quickly ascertain the meaning of a particular aspect of the drawing or drawing text. Because of this, traditional OCR principles seldom apply.

Unfortunately, throughout the design process, and sometimes into construction, plan documents are updated to reflect changes. In the absence of some real-world to computer integration, identifying the updated plan document for a particular location, floor, aspect, property, or the like can be difficult to do using a computer. As a result, an individual typically must cipher through each individual plan document to properly identify which aspect of a design project is identified in the document or which document is updated by the new document. This process is tedious, time-consuming, and not particularly valuable to a project, but is required if those using any computer-based system to review or provide comments on the project are to have any input in a reasonable, timely, and organized fashion.

DESCRIPTION OF THE DRAWINGS

FIG. 7 is a table showing a part of the process of performing text parsing on a complex graphical image.

FIG. 10 is a table of text parsed from complex graphical images.

FIG. 11 is an updated table of text parsed from complex graphical images.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
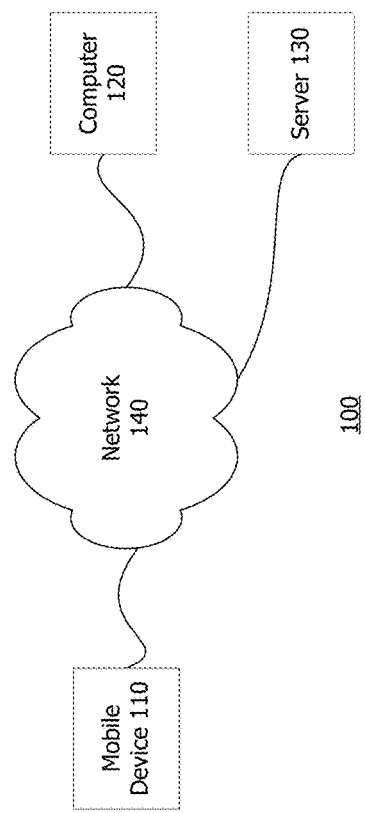
FIG. 1 is a complex graphical image text parsing system.

Referring now to FIG. 1 a complex graphical image text parsing system 100 is shown. The system 100 may include a mobile device 110, a computer 120, and a server 130, connected by a network 140. A system 100 may include more than one mobile device 110, more than one computing device 120, and more than one server 130.

Figure 3:
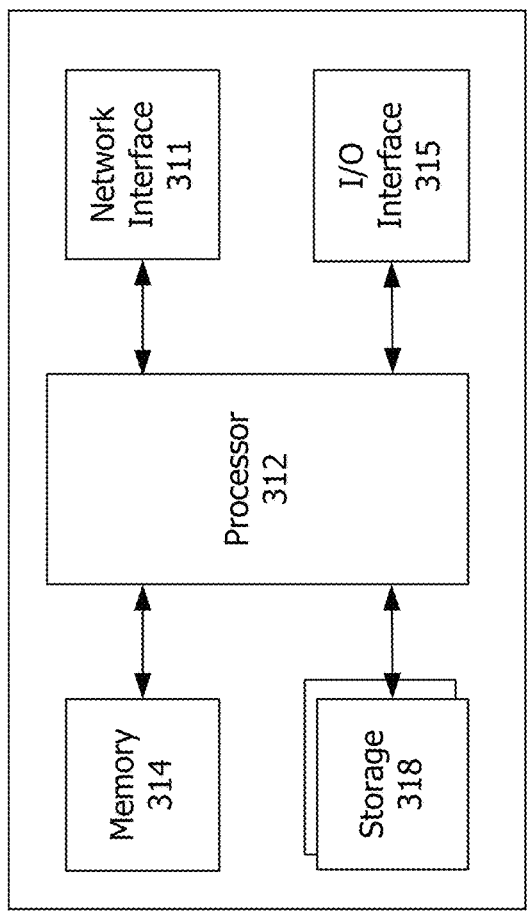
FIG. 3 shows a hardware diagram of a computing device.

The mobile device 110 is a computing device (as shown in FIG. 3) that utilizes software to access, store, and/or create files, including complex graphical images. These may be interacted upon directly or may be transmitted to the mobile device 110 or to the server 130, via the network 140 for operation. The mobile device 110 includes software operating on a computing device. The mobile device 110 may include operating system software in addition to application software for generating, viewing, editing or accessing files of various types. The mobile device 110 is shown as a mobile phone or a smart phone, but may also take the form of a tablet or other, similar portable, mobile computing devices.

The computer 120 is computing device (as shown in FIG. 3) that utilizes software to access, store, and/or create files, including complex graphical images. It is substantially similar to the mobile device 110 in function. However, the computer may incorporate more processing power, memory, and greater interactivity with software (through the use of a mouse and/or keyboard or other graphical editing devices such as digital pens). The computer 120 is shown as a traditional desktop computer, but may take the form of a laptop, a convertible computer or other, similar devices.

The server 130 is also a computing device (as shown in FIG. 3) that utilizes software to access, store, and/or create file, such as complex graphical image files. It is substantially similar to the mobile device 110 in function. However, the server 130 may also serve as a repository for numerous sets of complex graphical images and may provide access to the repository via web server software operating on the server 130 or another, related server. The server is, typically, a server-class computer accessible via the network 140, but may take any number of forms.

The network 140 may be or include a local area network, a wide area network, a personal area network, a mobile or telephone network, the Internet, an intranet, or any combination of these. The network 140 may have physical layers and transport layers according to IEEE 802.11, Ethernet or other wireless or wire-based communication standards and protocols such as WiMax®, Bluetooth®, mobile telephone and data protocols, the public switched telephone network, a proprietary communications network, infrared, and optical.

Figure 2:
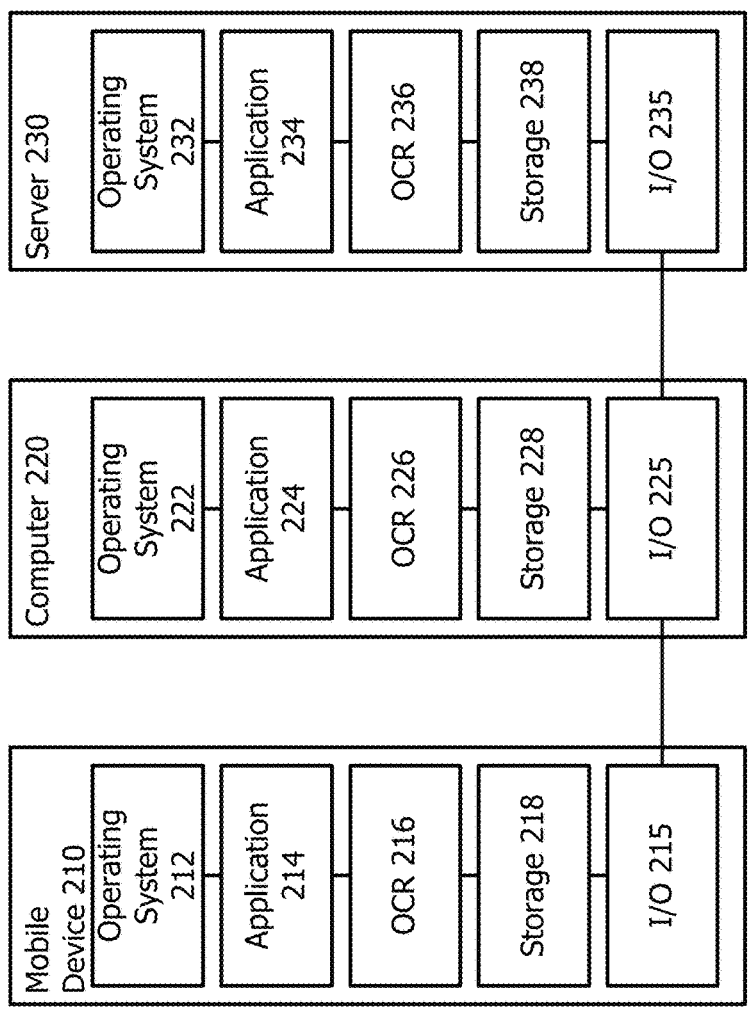
FIG. 2 is a functional diagram of a complex graphical image text parsing system.

FIG. 2 is a functional diagram of a complex graphical image text parsing system. The system includes a mobile device 210, a computer 220, and a server 230 (which may be the same as mobile device 110, computer 120, and server 130 of FIG. 1). Each of the mobile device 210, computer 220, and server 230 may include an operating system 212, 222, 232, one or more applications 214, 224, 234, optical character recognition (OCR) 216, 226, 236, storage 218, 228, 238, and I/O 215, 225, 235.

The operating system 212, 222, 232 provides a software environment on which application software may operate. Examples of operating systems include Windows®, Apple® OS X, Apple® iOS, Google® Android®, Linux, and similar operating systems.

The application 214, 224, 234 may be applications designed for viewing and editing architectural or design plans. These applications 214, 224, 234 may have differing functionality depending on whether they are available on the mobile device 210, the computer 220 or the server 230. Further, the application 234 may include web-based functionality such that it may be accessed by another computer through a web browser. The application 214, 224, 234 may include functionality that enables the processes described herein.

The OCR 216, 226, 236 is optical character recognition software that may be a part of the application 214, 224, 234 or may be a stand-alone application or plugin. The OCR 216, 226, 236 may function to convert images of the plans into text or into documents (like XML documents) including text and images.

The storage 218, 228, 238 stores data, either long-term or temporarily. For example, storage 238 on the server 230 may be a server storage location for one or many iterations of a plan for a particular project. However, storage 218, 228 may be storage sufficient to enable display of a particular project on a mobile device 210 or computer 220 for sufficient time to enable review. The storage 218, 228, or 238 may be used as a primary storage location from which other systems receive copies of the project files (via the network 140, for example) or may merely be a recipient copy for review and/or edits and/or comments by a mobile or remote user.

The I/O 215, 225, 235 may be software functionality implementing communications between the mobile device 210, the computer 220, and the server 230. These I/O 215, 225, 235 may be used to keep files in synchronization across multiple devices used by multiple individuals. Alternatively, the I/O 215, 225, 235 may enable comment and/or revisions by one or more of the users of mobile devices 210 and computers 220 to be stored on the server 230 within storage 238 so that the proposed changes or comments may be implemented in future versions of the associated project plan.

FIG. 3 shows a hardware diagram of a computing device 300. Computer device 300 may be representative of the server computers, client devices, mobile devices and other computing devices discussed herein. The computing device 300 may include software and/or hardware for providing functionality and features described herein. The computing device 300 may therefore include one or more of: logic arrays, memories, analog circuits, digital circuits, software, firmware and processors. The hardware and firmware components of the computing device 300 may include various specialized units, circuits, software and interfaces for providing the functionality and features described herein.

The computing device 300 may have a processor 312 coupled to a memory 314, storage 318, a network interface 311 and an I/O interface 315. The processor may be or include one or more microprocessors and application specific integrated circuits (ASICs).

The memory 314 may be or include RAM, ROM, DRAM, SRAM and MRAM, and may include firmware, such as static data or fixed instructions, BIOS, system functions, configuration data, and other routines used during the operation of the computing device 300 and processor 312. The memory 314 also provides a storage area for data and instructions associated with applications and data handled by the processor 312.

The storage 318 may provide non-volatile, bulk or long term storage of data or instructions in the computing device 300. The storage 318 may take the form of a disk, tape, CD, DVD, or other reasonably high capacity addressable or serial storage medium. Multiple storage devices may be provided or available to the computing device 300. Some of these storage devices may be external to the computing device 300, such as network storage or cloud-based storage.

The network interface 311 may be configured to interface to a network such as network 140 (FIG. 1).

The I/O interface 315 may be configured to interface the processor 312 to peripherals (not shown) such as displays, keyboards and USB devices.

Figure 4:
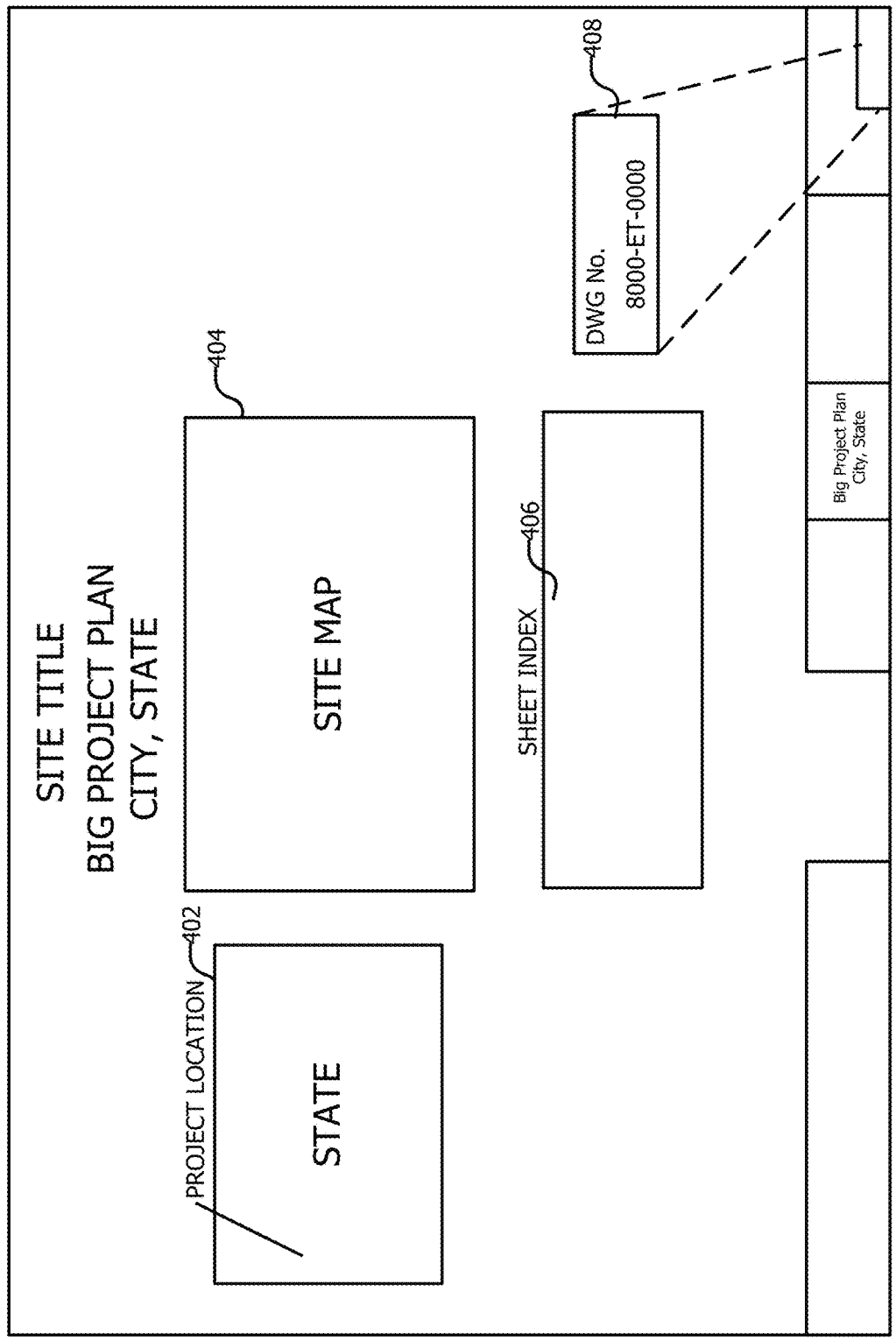
FIG. 4 is an example of a complex graphical image.

FIG. 4 is an example of a complex graphical image 400. The image 400 includes an overview 402, a blowup 404 of the overview 402 location, and a sheet index 406, because this is the first page of a multi-page plan. Identifying information, including a drawing number 408 appears at the bottom right of the image 400. The drawing number 408 may appear, as it does in this image 400, very small. It is blown up so that it may be seen.

Description of Processes

Figure 5:
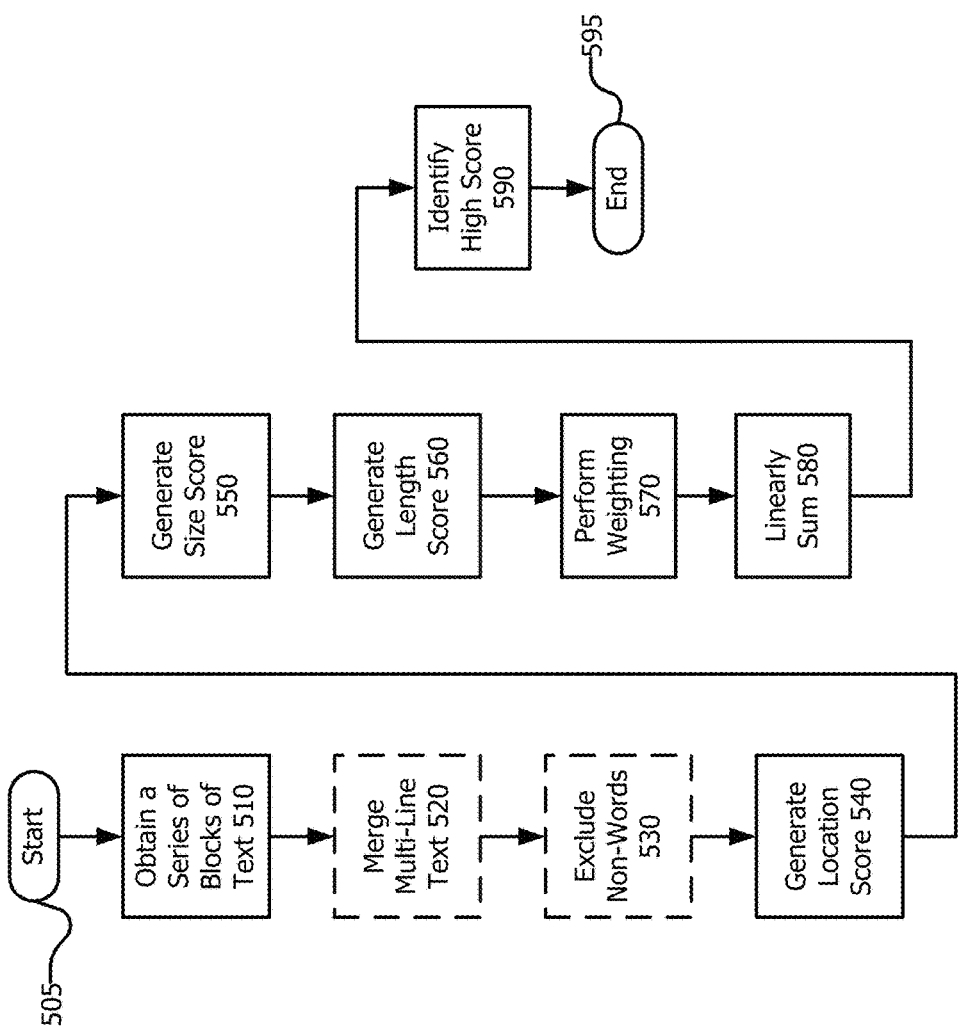
FIG. 5 is a flowchart showing a process of performing text parsing on a complex graphical image.

Referring now to FIG. 5, a flowchart showing a process of performing text parsing on a complex graphical image is shown. The process begins at start 505 and ends at end 595, but may take place iteratively or many instances may be taking place substantially at the same time with regard to multiple complex images being processed. The process uses a mobile device, a computer and a server, such as mobile device 110, computer 120, or server 130 of FIG. 1. Alternatively, portions of the process may take place on one of the devices and others may take place on another.

The process begins at 510 when, as OCR is performed on a complex graphical image, a processor obtains a series of blocks of text at 510. The blocks of text are obtained in a form including the text and one or more coordinates (or absolute distances—such as pixel distances—relative to a known point) identifying the location in the complex image that the text appeared. In addition, the height and width of the text blocks are also obtained. In this way, the full size and exact location of a given block of text is known. The blocks of text represent the textual data within a given region of the complex image. The coordinates or distances may be used to determine the location within the complex image as a part of determining a likelihood that a given text block is relevant to a particular search.

Figure 6:
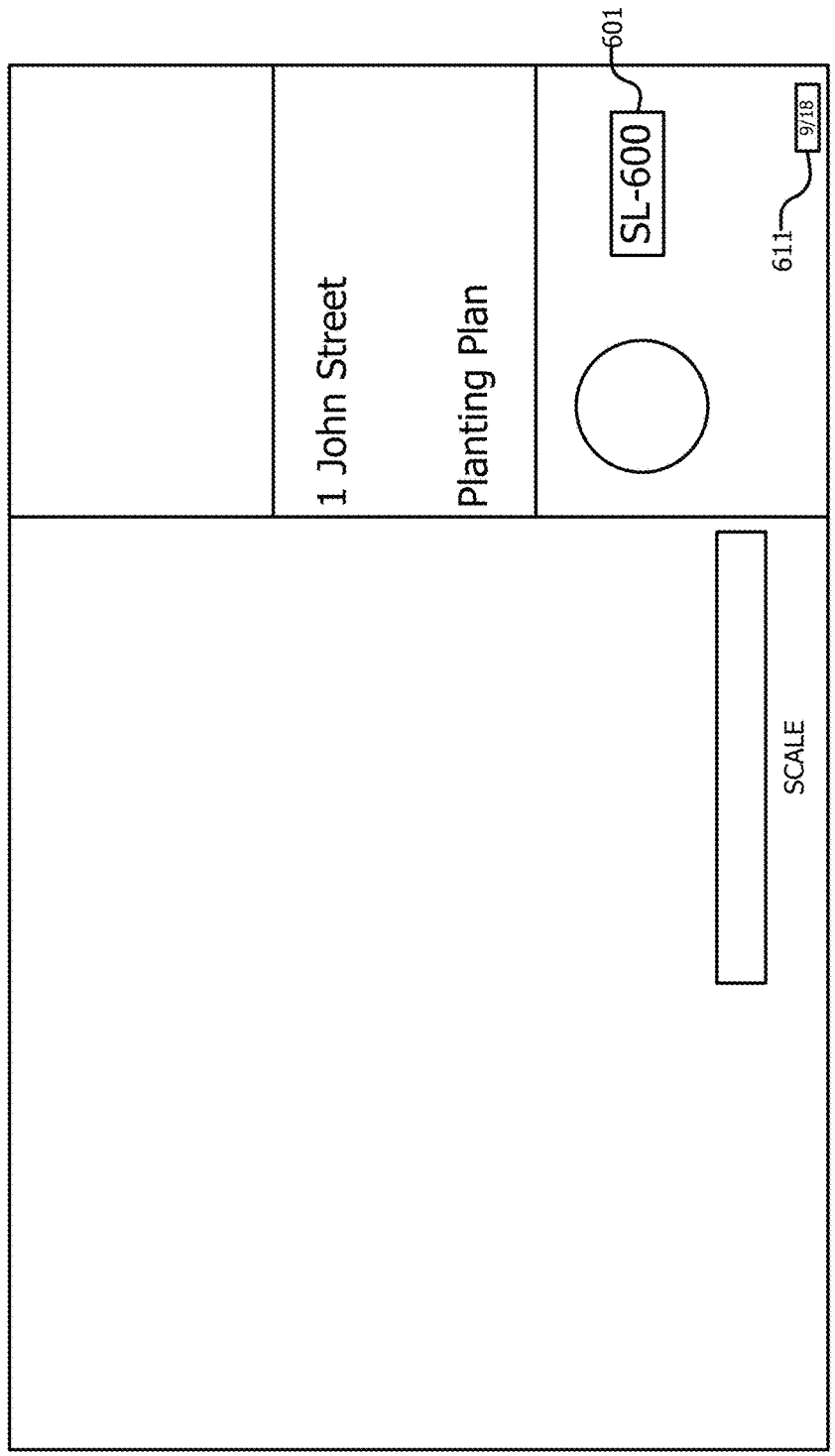
FIG. 6 is an enhanced view of one corner of a complex graphical image.

The drawing 600 shown in FIG. 6 and the table shown in FIG. 7 will be used as an example throughout the remainder of the description of FIG. 5. FIG. 6 is an enhanced view of one corner of a complex graphical image. FIG. 7 is a table showing a part of the process of performing text parsing on a complex graphical image. For purposes of an example, text block 1 601 and text block 2 611 of FIG. 6 are shown in a close-up view of the bottom, right corner of drawing 600. Text block 1 601 includes the text "SL-600" in box 702 (FIG. 7) and text block 2 includes the text "9/18" in box 712 (FIG. 7). Only two text blocks 601 and 611 are compared for purposes of this example, but typically, all text blocks in a given drawing are compared simultaneously.

Figure 8:
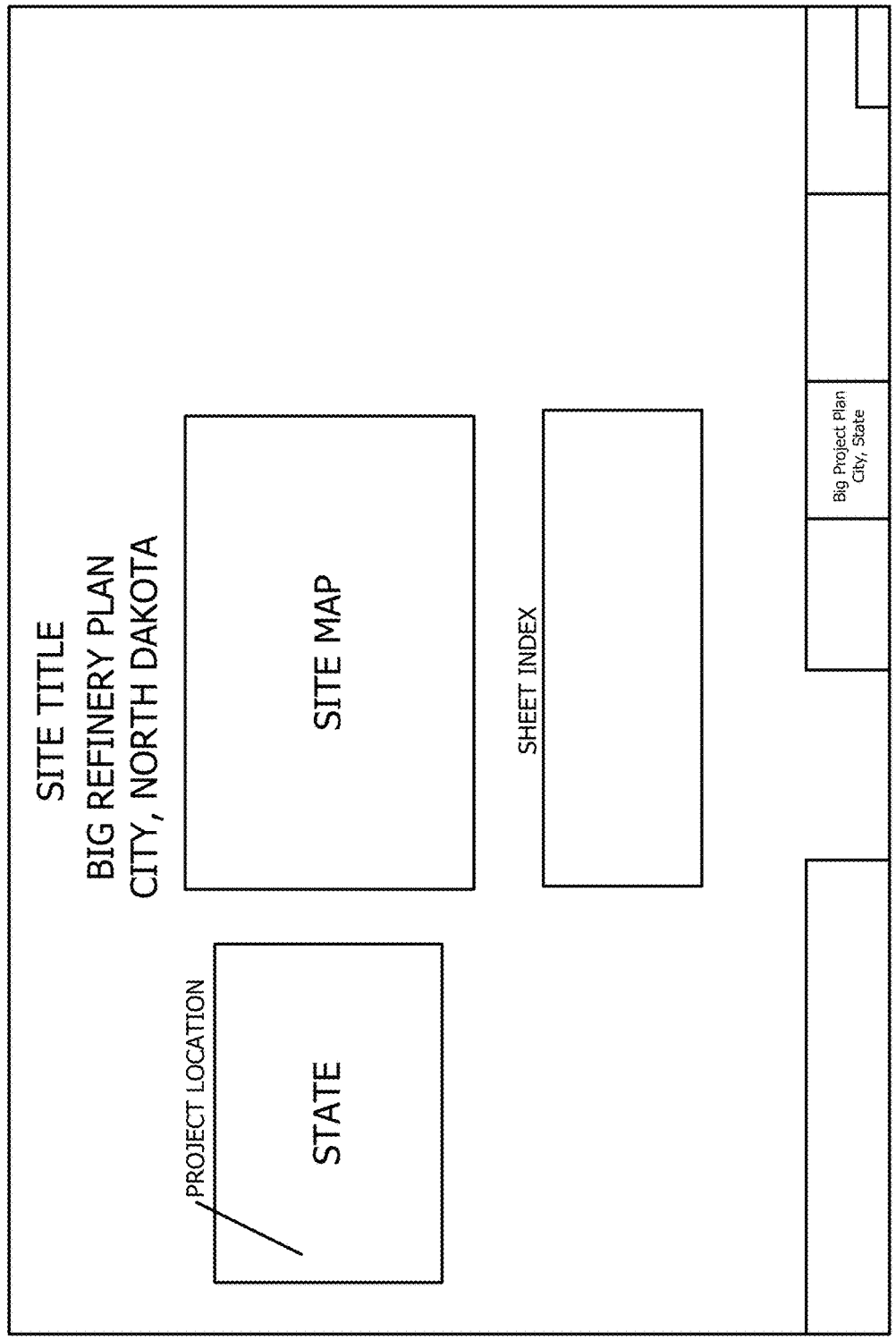
FIG. 8 is another example of a complex graphical image.

Returning to FIG. 5, multi-line text may, optionally, be merged at 520. Drawing titles, as opposed to drawing numbers, often run across several lines in a given drawing. Thus, to ensure that an entire drawing title is captured as a single text block, multi-line text may be merged when looking for drawing titles, but may not be merged when looking for drawing numbers. For example, in FIG. 8, which shows another example of a complex graphical image, the text "BIG REFINERY PLAN CITY, NORTH DAKOTA" may be merged across the two lines it appears on because it is the same font size, in text blocks immediately adjacent to one another (on top of one another).

Next, known words optionally may be excluded at 530. This may be called a filtering process—a process for filtering out words or elements known not to be relevant in particular contexts. Certain textual elements, such as document numbers for plan drawings and architectural drawings, are unlikely to include words in a known language, such as English. Thus, a dictionary database can be compared against each text block and, if a matching word is found in the language of the relevant dictionary database, that text block can be excluded from text blocks that are likely to be a document number.

This step is optional, as shown by dashed lines surrounding the step, because it may or may not be performed in particular implementations of this process. For example, drawing titles tend to include known words, while drawing numbers do not. So, in the case of drawing titles, known words may not be excluded, whereas with drawing numbers, known words are intentionally excluded. In FIG. 6, the process is attempting to detect drawing numbers, so text blocks including known words are excluded. Neither text block 1 601 nor text block 2 611 includes known words, so neither is excluded from those being considered. This is shown in boxes 703 and 713 of table 700 in FIG. 7. FIG. 7 shows an example of the calculations done with regard to text block 1 601 and text block 2 611 in order to derive the highest weighted score.

Next, at 540 a location score is generated for each text block based on location of the text block within the complex graphical image. For example, for architectural and plan drawings, certain text often appears closest to the bottom, right corner of the drawing. In particular, drawing numbers, identifying a particular drawing from an overall multi-drawing plan, typically appear at or near the bottom, right corner of a drawing. In contrast, drawing titles, such as the name of a particular view (e.g. "Parking Plan—Second Floor") are not often in the bottom, right corner.

In plans incorporating potentially hundreds or thousands of drawings, automatic identification of the drawing number is very helpful in determining when new revisions or comments are made to a particular drawing. Those drawing pages may, then, be scanned as a group, and the process described herein may enable a computer to automatically update a database of drawings for a particular architectural project or site plan to incorporate the new, revised or commented drawings only over those drawings with changes.

A location score may be calculated based upon the number of pixels in an image from the bottom, right corner of the drawing a particular text block appears. This location score calculation may be performed for all or substantially all text blocks received at 510. Comparing text block 1 601 with text block 2 611 in FIG. 6 results in a location value of 227 px (FIG. 7, box 706) to 53 px (FIG. 7, box 716). The location score may be a straight-line measurement from the bottom, right of a document to the bottom, right of a given text block as measured in pixels or may be some other measurement useful to determine a relative location compared to other text blocks in the same drawing.

The location scores are derived by normalizing the location values from the largest to the smallest. So, if the largest location value is 1000 pixels, and the smallest is 0 pixels, then a location value of 100 pixels would receive a location score of 0.90 because it is only 10% of the 1000 pixels from the bottom, right corner. In FIG. 7, the location value of 227 px shown in box 706 results in a location score is 0.84 as shown in box 707. Similarly, the location value of 53 px shown in box 716 results in a location score of 0.97 as shown in box 717 because it is very close to the bottom, right corner.

Next, a size score is generated for each of the text blocks based upon their size at 550. Drawing numbers for architectural plans or site plans tend to be larger in size than most other text appearing on a given drawing. Drawing titles, likewise, tend to be larger in size, also they tend to be multiple lines in a drawing in addition to, being in larger text. So, a size score may be assigned to a particular size of a text block.

The size values of text blocks 1 601 and 2 611 are different. As can be seen visually in FIG. 6, text block 1 601 is a much larger font than text block 2 611. In FIG. 7, the size values (in this case, the font height) is determined to be 41 px for text block 1 701 as shown in box 704, whereas the size value is determined to be 12 px for text block 2 711 as shown in box 714. These values are determined based upon the size of the text block containing the text being tested. The literal size is somewhat irrelevant, whereas the size relative to other text blocks is the real comparison being made.

Thus, to calculate the size scores 705 and 715 based upon these size values 704 and 714 are calculated, like the location scores, by normalizing from the largest to the smallest sizes. It turns out, in this case, that the size value 41 px shown in box 704 is 0.35 (or 35% of the largest font in the drawing) and the size value 12 px shown in box 714 is 0.12 (or 12% of the largest font in the drawing). Thus, the size score 705 for text block 1 701 is 0.35 and the size score 715 for text block 2 711 is 0.12.

Next, a length score is generated at 560 for each of the text blocks based on the length of the characters appearing therein. Drawing numbers tend to be short. So, when searching for drawing numbers shorter text blocks receive higher length scores. In contrast, drawing titles tend to be longer, and as indicated above, multiple lines. So, for drawing titles, longer text blocks receive higher length scores. Scores may be calculated differently for different elements within a document that are being identified.

In the example text blocks 1 601 and 2 611 of FIG. 6, the length (including spaces) is 6 characters for both. This is shown in box 708 and 718, respectively, in FIG. 7. Because the lengths are the same, the resulting length score of 0.79 shown in boxes 709 and 719 are the same. As discussed above, the longest set of characters in the drawing is set to 1, and the shortest set of characters is set to 0, with all other character lengths in between normalized along that distribution. Thus, the length scores for text blocks 1 701 and 2 711 are both 0.79 (79%) shown in boxes 709 and 719.

Finally, a weighting is performed at 570 for the location scores, size scores and length scores associated with each text block. Depending on what text is being sought, a weighted score for a particular text block may be identified as most likely to be associated with a sought after text block. For example, for a drawing number identification, as discussed above, closer to the bottom, right of a drawing is more likely to be a drawing number, a larger font size is more likely to be a drawing number, and a shorter set of characters is more likely to be a drawing number.

Weights may be applied to each of these characteristics independently. Further, the weights applied may differ depending on the type of text desired to be identified. Example weights 730 are shown in FIG. 7. For size scores, when searching for drawing numbers, the weighting applied is 0.52. For location scores, the weighting applied is 0.31. For length scores, the weighting is 0.17. The total weights 720 adds up to 1 (100%). These weights 720 are only examples and may be altered over time to include more or fewer bases and, further, the weights themselves may be altered while not changing the overall scope of the process described herein.

Next, the result of each score times its weight is linearly summed at 580 in order to derive an overall weighted score for each text block. This process may be seen for text block 701 (601 in FIG. 6) and text block 711 (611 in FIG. 6), respectively, in box 710 and box 720. The scores times their respective weights result in a calculation of 0.35*0.52+ 0.84*0.31+0.79*0.17 which equals 0.577, shown in box 710, for text block 1 701 and 0.12*0.52+0.97*0.31+ 0.79*0.17 which equals 0.497, shown in box 720, for text block 2 711. Thus, the cumulative score for text block 1 601 (FIG. 6) of 0.577 (shown in box 710) is higher than the cumulative score for text block 2 611 (FIG. 6) of 0.497 (shown in box 720).

Finally, the text block with the highest weighted score is identified at 590 as the most likely to be the sought-after text block. In FIGS. 6 and 7, the score of 0.577 for text block 1 601 (701 in FIG. 7) is highest between the two. Thus, it is most likely to be the drawing number.

Figure 9:
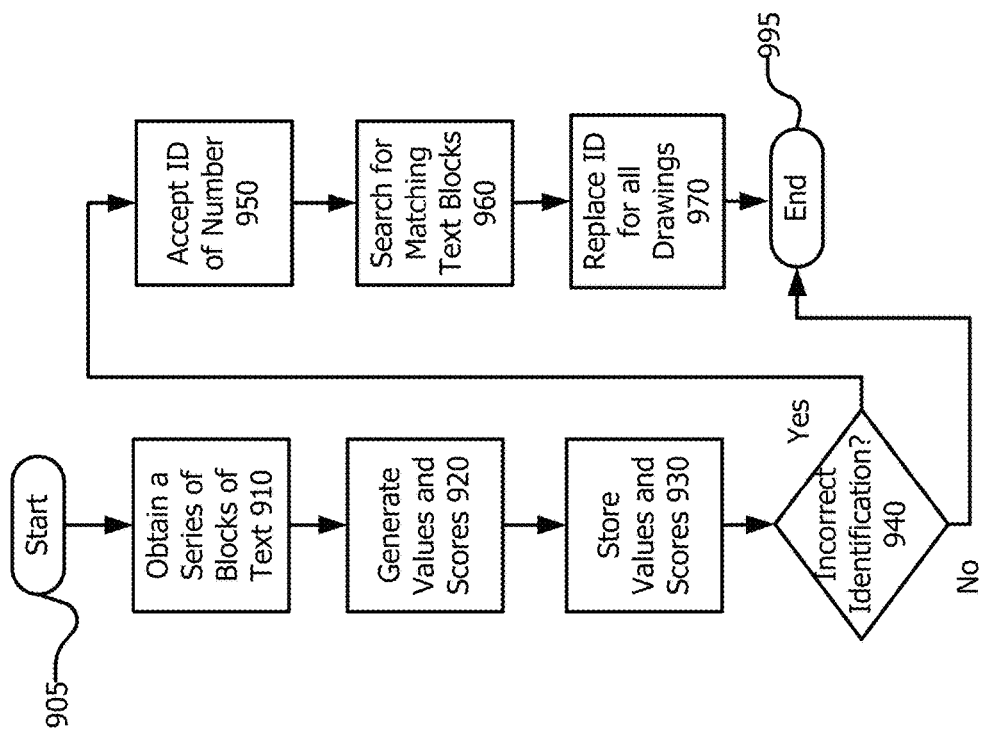
FIG. 9 is a flowchart of an adaptive system of correcting incorrectly identified text in a system for text parsing complex graphical images.

FIG. 9 is a flowchart of an adaptive system of re-identifying incorrectly identified text in a system for text parsing complex graphical images. The flow chart has both a start 905 and an end 995, but the process may be cyclical in nature. The first few steps, are completed as a part of the process described with reference to FIG. 5, the remaining steps take place after-the-fact in order to automatically correct issues regarding the automatic detection of a drawing title or drawing number within a complex graphical image.

First, a series of blocks of text are obtained at 910. These blocks may be obtained by OCR performed by a mobile device, computer, or server. These blocks of text may span multiple lines, which may be joined by the present system.

Next, a series of size, location, and length values (and associated scores) are generated at 920. As indicated above this may take place as a part of the process shown in FIG. 5. However, these values and scores are stored at 930, for example in storage available to a mobile device, computer, or server.

As a part of storage of the values and scores at 920, data accessible via software or web-based user interface, pertaining to the scanned drawings may be generated. FIGS. 10 and 11 are examples of a table 1000 or 1100 formed from text parsed from complex graphical images. FIGS. 10 and 11 will be referred to for the remainder of the description of FIG. 9.

Either during a drawing review process, or after a table like table 1000 is accessed, an individual may determine that the incorrect drawing numbers have been identified by the process described in FIG. 5. After determining that a drawing number is incorrect, a user may input a correction using a mobile device, computer, or server by a button, by a menu interaction with a user interface, or by beginning the process (or completing the process) of correcting one of the data entries in the table 1000.

The process of identifying an incorrect drawing number may take place as a part of a presentation of the results of scanning a document set, enabling an individual to correct automated selections before the associated text is incorporated into a table like table 1000. If it is a part of a review process, the user may simultaneously or upon request be presented with a preview of the associated image to aid the user in identifying the correct text for each automatically-selected document portion. In this way, the individual need not memorize or remember sometimes complex and long document titles and/or numbers when correcting them. Instead, the user may merely refer in real time to the scanned document itself.

By way of an example, the user may perform this update while reviewing a table presentation like table 1000. In table 1000, a set of figures for the "Architectural" plans section have been updated by client revisions. As a result, only a subset of the full drawing set has been recently-updated, not the entire set. The drawing numbers for these drawings have been automatically detected, incorrectly, as 16, 24, 34 and 44 as shown in boxes 1010, 1020, 1030, and 1040. As a human would readily determine, those drawing numbers do not fit in with the scheme A1, A2, A5, etc.

A correction may begin, for example, by interaction by a user with the first of these, for example box 1010. The individual may look at the figure itself or may simply know that the appropriate label is A3 and begin the correction process. This is the acceptance of an identification of an appropriate number at 950 in place of the incorrectly identified number at 940.

Next, at 960, the system, operating on the mobile device, computer, or server, searches the remaining drawings, either in the entire set or in a recently-added subset, for matching text blocks. Here, the matching text blocks are only searched for within the recently-updated subset of drawings with the incorrect labels. Those text blocks matching the replaced text (in this case, a drawing number) are identified using the stored values and scores.

In particular, the drawing number that was input (or a very close match) is found within the stored values and scores for the drawing that was corrected. Next, the values and scores for that drawing number are determined. In the process of searching for matching text blocks at 960, the values and scores for the value that is found within each drawing can be compared against text blocks with similar values and scores in every other drawing in the set (or subset). Thus, without even referring to the content of each text block, the process may identify the most likely candidate for the correct text block including a drawing number. A further comparison may be made to the content of the text block to determine whether or not it is likely the correct text block.

Once the correct text block is identified in each of the remaining drawings by most closely matching the values and/or scores of the newly-identified text block in one of the drawings, it may automatically be replaced for all drawings at 970 for the entire set of drawings or an identified subset of drawings. An example of this replacement is shown in boxes 1110, 1120, 1130, and 1140 of FIG. 11 where the numbers 16, 24, 34, and 44 have been replaced with the appropriate numbers A3, A4, A6, and A7.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of" respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system parsing text in complex graphical images, the system comprising a processor executing program instructions which cause the processor to:
   obtain a series of blocks of text, associated location coordinates, and bounding box data indicating a size for each block of text, from a complex graphical image;
   generate location scores for each of the series of blocks of text using the associated location coordinates;
   generate size scores for each of the series of blocks of text using the size for each of the series of blocks of text;
   normalize the location scores and the size scores;
   weight each of the location scores by multiplying by a location weighting to create a weighted location score;
   weight each of the size scores by multiplying by a size weighting to create a weighted size score;
   for each block of text of the series, sum the weighted location score and the weighted size score to derive an overall score for each block of text of the series; and
   identify a highest score text block associated with a highest overall score as the most likely to be a desired text block.

2. The system of claim 1 wherein the instructions further cause the processor to merge multiple, immediately adjacent lines of text into a single block of text prior to generation of an associated size score.

3. The system of claim 1 wherein the instructions further cause the processor to exclude from consideration blocks of text from the series of blocks of text that include numerals.

4. The system of claim 1 wherein the instructions further cause the processor to exclude from consideration blocks of text from the series of blocks of text that do not include numerals.

5. The system of claim 1 wherein the instructions further cause the process to exclude from consideration blocks of text from the series of blocks of text that include known words.

6. The system of claim 1 wherein each location score is created on a scale of 1.0 to 0.0 with blocks of text closest to a lower, right-hand corner receiving a location score of 1.0 and blocks of text closest to an upper, left hand corner receive a location score of 0.0 with interpolation used to generate location scores for those blocks located in between.

7. The system of claim 1 wherein the instructions further cause the processor to
   filter out blocks of text that do not incorporate a word from a language;
   generate length scores for each of the series of blocks of text;
   normalize the length scores;
   weight each of the length scores by multiplying by a length weighting to create a weighted length score;
   for each blocks of text of the series, add the weighted length score to the overall score for each block of text of the series; and
   identify the highest score text block associated with a highest overall score added to the weighted length score as the most likely to be the desired text block.

8. The system of claim 7 wherein blocks of text are compared one to another and blocks of text that are longer receive higher length scores than blocks of text that are shorter.

9. The system of claim 1 further comprising:
   the processor; and
   a memory storing the program instructions.

10. An apparatus comprising a non-transitory storage medium storing a program having instructions which when executed by a processor will cause the processor to:
    obtain a series of blocks of text, associated location coordinates, and bounding box data indicating a size for each block of text, from a complex graphical image;
    generate location scores for each of the series of blocks of text using the associated location coordinates;
    generate size scores for each of the series of blocks of text using the size for each of the series of blocks of text;
    normalize the location scores and the size scores;
    weight each of the location scores by multiplying by a location weighting to create a weighted location score;
    weight each of the size scores by multiplying by a size weighting to create a weighted size score;
    for each block of text of the series, sum the weighted location score and the weighted size score to derive an overall score for each block of text of the series; and
    identify a highest score text block associated with a highest overall score as the most likely to be a desired text block.

11. The apparatus of claim 10 wherein the instructions further cause the processor to merge multiple, immediately adjacent lines of text into a single block of text prior to generation of an associated size score.

12. The apparatus of claim 10 wherein the instructions further cause the processor to exclude from consideration blocks of text from the series of blocks of text that include numerals.

13. The apparatus of claim 10 wherein the instructions further cause the processor to exclude from consideration blocks of text from the series of blocks of text that do not include numerals.

14. The apparatus of claim 10 wherein the instructions further cause the processor to exclude from consideration blocks of text from the series of blocks of text that include known words.

15. The apparatus of claim 10 wherein each location score is created on a scale of 1.0 to 0.0 with blocks of text closest to a lower, right-hand corner receiving a location score of 1.0 and blocks of text closest to an upper, left hand corner receive a location score of 0.0 with interpolation used to generate location scores for those blocks located in between.

16. The apparatus of claim 10 wherein the instructions further cause the processor to:
   filter out blocks of text that do not incorporate a word from a language;
   generate length scores for each of the series of blocks of text;
   normalize the length scores;
   weight each of the length scores by multiplying by a length weighting to create a weighted length score;
   for each blocks of text of the series, add the weighted length score to the overall score for each block of text of the series; and
   identify the highest score text block associated with the highest overall score including the weighted length score as the most likely to be the desired text block.

17. The apparatus of claim 16 wherein blocks of text are compared one to another and blocks of text that are longer receive higher length scores than blocks of text that are shorter.

18. The apparatus of claim 10 further comprising:
   a processor; and
   a memory storing the instructions.

19. A system parsing text in complex graphical images, the system comprising a processor executing program instructions which cause the processor to:
   obtain a series of blocks of text, associated location coordinates, and bounding box data indicating a size for each block of text from a complex graphical image;
   generate location scores for each of the series of blocks of text using the associated location coordinates, the associated location coordinates most-likely to be a location of a title within the complex graphical image receiving a higher score than those less-likely to be the location of a title;
   generate size scores for each of the series of blocks of text using the size for each of the series of blocks of text, with larger sizes associated with a block of text receiving higher scores than smaller sizes;
   normalize the location scores and the size scores on a scale from 0.0 being lowest to 1.0 being highest;
   weight each of the location scores by multiplying by a location weighting to create a weighted location score;
   weight each of the size scores by multiplying by a size weighting to create a weighted size score;
   for each block of text of the series, sum the weighted location score and the weighted size score to derive an overall score for each block of text of the series; and
   identify a highest score text block associated with a highest overall score as the most likely to be a desired text block.

20. The system of claim 19 wherein the size weighting is larger than the location weighting so as to identify a document title within the complex graphical image.

* * * * *